United States Patent
Yu (10) Patent No.: US 12,106,450 B2
(45) Date of Patent: Oct. 1, 2024

(54) METHODS AND DEVICES FOR GENERATING A BLURRED IMAGE

(71) Applicant: Shopify Inc., Ottawa (CA)

(72) Inventor: Peng Yu, Montreal (CA)

(73) Assignee: Shopify Inc., Ottawa (CA)

( * ) Notice: Subject to any disclaimer, the term of this patent is extended or adjusted under 35 U.S.C. 154(b) by 239 days.

(21) Appl. No.: 17/514,054

(22) Filed: Oct. 29, 2021

(65) Prior Publication Data

US 2023/0140051 A1    May 4, 2023

(51) Int. Cl.
| | |
|---|---|
| *G06T 5/70* | (2024.01) |
| *G06F 40/143* | (2020.01) |
| *G06F 40/166* | (2020.01) |
| *G06T 3/40* | (2006.01) |
| *G06T 5/10* | (2006.01) |
| *G06T 5/20* | (2006.01) |
| *G06T 9/00* | (2006.01) |

(52) U.S. Cl.
CPC .............. *G06T 5/70* (2024.01); *G06F 40/143* (2020.01); *G06F 40/166* (2020.01); *G06T 3/40* (2013.01); *G06T 5/10* (2013.01); *G06T 5/20* (2013.01); *G06T 9/00* (2013.01); *G06T 2207/20052* (2013.01)

(58) Field of Classification Search
None
See application file for complete search history.

(56) References Cited

U.S. PATENT DOCUMENTS

| | | | | |
|---|---|---|---|---|
| 7,474,805 | B2 * | 1/2009 | Nowicki | G06T 3/4084 |
| | | | | 382/298 |
| 10,275,806 | B2 * | 4/2019 | Carasso | H04L 67/02 |
| 2005/0128312 | A1 * | 6/2005 | Fredlund | H04N 25/42 |
| | | | | 348/222.1 |

(Continued)

FOREIGN PATENT DOCUMENTS

| | | |
|---|---|---|
| CA | 2599357 | 10/2006 |
| EP | 3262835 | 1/2018 |

OTHER PUBLICATIONS

Dang et al.("Image Fusion based on Sparse Sampling Method and Hybrid Discrete Cosine Transformation" International Journal of Scientific & Technology Research vol. 8, Issue 12, Dec. 2019 (Year: 2019).*

(Continued)

*Primary Examiner* — Saptarshi Mazumder
(74) *Attorney, Agent, or Firm* — Rowand LLP (57) ABSTRACT

A computer-implemented method and system for generating a blurred image from an original image. The method and system generate the blurred image using a process that enables fast efficient decoding of the compact encoded blurred image by a client device. The method may include transforming an original image to a block of coefficients in a frequency domain, low-pass filtering the block of coefficients in the frequency domain to produce a block of filtered coefficients, inverse transforming the block of filtered coefficients to produce a blurred image in a pixel domain, encoding the blurred image using a lossy-compression image encoder to produce an encoded blurred image, and transmitting the encoded blurred image to a client device for reconstruction and display by the client device.

21 Claims, 5 Drawing Sheets

(56) References Cited

U.S. PATENT DOCUMENTS

| 2010/0046753 A1* | 2/2010 | Inami | H04N 1/32133 |
| | | | 380/243 |
| 2015/0172669 A1* | 6/2015 | Nishiyama | H04N 19/136 |
| | | | 375/240.08 |
| 2021/0144312 A1* | 5/2021 | Gandhi | H04N 23/69 |

OTHER PUBLICATIONS

Kumar et al. "A novel method for image compression using spectrum." 2017 Ninth International Conference on Advances in Pattern Recognition (ICAPR). IEEE, 2017' (Year: 2017).*
Pottorff et al., DE 102021122615 (Year: 2021).*
International Search Report & Written Opinion dated Feb. 7, 2023; WIPO Application No. PCT/CA2022/051578.

* cited by examiner

| | 0 | | | | | | | 7 |
|---|---|---|---|---|---|---|---|---|
| 0 | $w_{00}$ | $w_{10}$ | $w_{20}$ | $w_{30}$ | 0 | 0 | 0 | 0 |
| | $w_{01}$ | $w_{11}$ | $w_{21}$ | $w_{31}$ | 0 | 0 | 0 | 0 |
| | $w_{02}$ | $w_{12}$ | $w_{22}$ | $w_{32}$ | 0 | 0 | 0 | 0 |
| | $w_{03}$ | $w_{13}$ | $w_{23}$ | $w_{33}$ | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| 7 | 0 | 0 | 0 | 0 | 0 | 0 | 0 | 0 |

FIG. 7

| | 0 | | | | | | | 7 |
|---|---|---|---|---|---|---|---|---|
| 0 | 207 | -66 | 112 | -65 | 0 | 0 | 0 | 0 |
| | 185 | 22 | -80 | 30 | 0 | 0 | 0 | 0 |
| | -97 | 43 | -28 | 46 | 0 | 0 | 0 | 0 |
| | -10 | 36 | -69 | -97 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| 7 | 0 | 0 | 0 | 0 | 0 | 0 | 0 | 0 |

FIG. 8

METHODS AND DEVICES FOR GENERATING A BLURRED IMAGE

TECHNICAL FIELD

The present disclosure relates to image compression, transmission and decoding and, in particular, to methods and systems for compressing and sending placeholder images derived from original images that are computationally efficient to decode and display.

BACKGROUND

Mobile applications and webpages are often crafted to provide a carefully designed user experience, with judiciously selected colour schemes, layouts, graphics, and imagery. High resolution imagery can be important to the impression of quality, but can also result in delays for display of the application or webpage as the client device downloads and reconstructs the high resolution images. This can have a negative impact on the user experience and the overall impression of the page, particularly if it moves around as reconstructed images are progressively inserted while they are being reconstructed, or if placeholder images provide for a jarring or incomplete visual experience.

BRIEF DESCRIPTION OF THE DRAWINGS

Embodiments will be described, by way of example only, with reference to the accompanying figures wherein.

DETAILED DESCRIPTION OF EMBODIMENTS

In an aspect, the present application discloses a computer-implemented method that may include transforming an original image to a block of coefficients in a frequency domain; low-pass filtering the block of coefficients in the frequency domain to produce a block of filtered coefficients; inverse transforming the block of filtered coefficients to produce a blurred image in a pixel domain; encoding the blurred image using a lossy-compression image encoder to produce an encoded blurred image; and transmitting the encoded blurred image to a client device for reconstruction and display by the client device.

In some implementations, transforming the original image to a block of coefficients in the frequency domain includes applying a two-dimensional discrete-cosine transform (DCT) operation to the original image. In some cases, the lossy-compression image encoder uses the two-dimensional DCT operation in encoding the blurred image. In some cases, the original image is of size N×M pixels and the two-dimensional DCT operation is an N×M DCT operation.

In some implementations, the low-pass filtering includes applying a mask to the block of coefficients whereby coefficients outside a selected subset defined by the mask are set to zero. In some cases, the selected subset includes a DC coefficient in an upper left corner of the block of coefficients and a plurality of coefficients adjacent to the DC coefficient. In some cases, the selected subset includes a quarter or fewer of the coefficients in the block of coefficients. In some cases, the selected subset includes a sub-block smaller than the block of coefficients and positioned in the upper left corner of the block of coefficients.

In some implementations, the method may further include first down-scaling a full-size image in the pixel domain to obtain the original image.

In some implementations, encoding includes outputting the encoded blurred image, and wherein transmitting includes encoding the encoded blurred image as a string and inserting the string in a markup language document transmitted to the client device. In some cases, the markup language document includes a webpage. In some cases, the webpage further includes x and y dimensions associated with the string, and a scaling factor for upscaling a reconstructed blurred image from the string based on the dimensions. The webpage may further include a reference to a high resolution image file corresponding to the original image, and instructions to replace display of the reconstructed blurred image with a reconstructed high resolution image obtained by decoding the high resolution image file once available, the x and y dimensions corresponding to dimensions of the high resolution image file.

In another aspect, the present application describes a computing system that includes a processor and memory. The memory may store computer-executable instructions that, when executed, cause the processor to carry out the operations of one or more of the methods described herein.

In yet a further aspect, the present application describes a computer-readable medium storing computer-executable instructions that, when executed by a processor, are to cause the processor to carry out the operations of one or more of the methods described herein. The computer-readable medium may be non-transitory.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and associated payment requests, via an e-commerce platform, and the e-commerce platform may be equipped with transaction/payment processing components or delegate such processing activities to one or more third-party services. An e-commerce platform may be extendible/extensible by connecting one or more additional sales channels representing platforms where products can be sold. In particular, the sales channels may themselves be e-commerce platforms, such as Facebook Shops™, Amazon™, etc.

Using e-commerce as a non-limiting example, an ecommerce platform may make an online "storefront" available to consumers through a mobile app or through a web browser. The mobile app may provide the user with access to a particular merchant's online storefront by downloading and displaying the merchant's page or pages. Likewise, a web browser may provide a user with access to the particular merchant's online storefront by downloading and displaying the merchant's webpage or webpages. The pages may be mark-up language documents in some cases, such as XML, HTML, etc. In any of these situations, the layout, colours, and images in the pages are carefully selected and arranged to realize a particular design aesthetic and impact. Considerable thought and design consideration goes into how the graphical elements interact with and relate to each other visually. In many cases, the pages incorporate one or more high resolution images. For instance, a webpage of a storefront may have one or more high resolution images of the available products. Those images may be referenced in the webpage for the storefront and may be downloaded, decoded, and displayed based on the reference link in the webpage markup language document.

In some cases, it may take significantly longer to download, reconstruct and display the high resolution images than it does to render the rest of the page. If the receiving device waits for the images to be completely reconstructed before displaying the page, then the user will likely assume the page load has failed. Accordingly, the device may initially display the page without the images and may add them in afterwards. This can result in the layout of the page jumping around in the time period after initial display as images are inserted into the page. Insertion of images after the initial display of the page can cause some graphical elements to move during the initial moments after rendering, which is both visually displeasing and can result in accidental selection of incorrect links or other selectable elements.

In some jurisdictions, legal requirements may mean certain images must be excised or removed from display, e.g. the server is required to provide a modified page without the prohibited images based on the country location of the receiving device. If the images are removed, the overall design aesthetic and layout may be compromised.

In some cases the high resolution images are replaced with initial placeholder blocks of the same size as the images. The placeholder blocks may be solid white or black blocks or may be the colour of the background of the page. This technique may cure the movement and/or layout problem, but may also be visually jarring and unappealing as the colour scheme may be disjointed since the colour expected in the image is not initially displayed. The user may also perceive that the site is defective or has failed to load properly due to the blocks.

Yet another technique is to initially display a lower resolution version of the image that is eventually replaced by a higher resolution version of the image. In some cases, progressive encoding may be employed to realize this effect. This can also be visually disappointing since the blocky or pixelated low resolution image gives a negative impression of the page quality. Moreover, a low resolution or low quality version of the image may still be a prohibited image in the situation in which certain images cannot be displayed.

More recently, web designers have started using a BlurHash algorithm, developed by Wolt of Finland, to encode and send a blurred version of the image that preserves the dominant colour information, but obscures the detail of the image. With sufficient compression, the BlurHash algorithm can produce a compact file or string that advantageously represents the original colour scheme consistent with the design impression, without appearing empty or low quality. However, the BlurHash algorithm has drawbacks, including its use of a custom implemented inverse discrete cosine transform (IDCT) algorithm that needs to be downloaded and run on the client device, and that is implemented using processor-inefficient nested-for-loops.

It would be advantageous to provide for methods and systems that provide for a compactly-compressed blurred version of an image with faster speed and/or lower computational burden on the receiving device.

In accordance with an aspect of the present application, a blurred image is produced using a technique that generates the blurred image in a format that enables use of a conventional image decoder at the receiving device. For example, the compact blurred image may be generated in a conventional JFIF file format so that the receiving device may employ its computationally-efficient JPEG decoder to reconstruct the blurred image from the file. Standardized compressed image file formats other than JFIF may be used in some implementations. In some cases, the standardized compressed file may be encoded as a string and embedded in the mark-up language file downloaded by the received device, rather than including a reference in the mark-up language file that points to a separate file that is then downloaded.

To blur the image and to ensure it can be efficiently and compactly compressed using the standardized file format, the present application describes a process of spectrally transforming the image into the frequency domain, low-pass filtering the image in the frequency domain to blur it, inverse transforming the filtered image back to the pixel domain as a blurred image, and then encoding the blurred image using a standardized encoding algorithm like JPEG.

The term "blurred image" using herein refers to an image in which the detail of the original image has been sufficiently obscured such that no information regarding its structural contents, e.g. edges, shapes, etc., is discernible, but that preserves and shows some blurred colour information. In some implementations, the "blurred image" may be distinguished from a blocky image in which a block-based coding/decoding process results in a blocky or pixelated image. The blurred image may appear as a relatively smooth blend of colours that reflects the general colour content of the original image, without appearing blocky and/or without communicating information regarding the non-colour content of the original image.

In some implementations, the method and system may use JPEG for blurred image encoding. The resulting file format may be a JPEG-compliant file format. For example, in some cases the file may be in JPEG File Interchange Format (JFIF), Exchangeable Image File (EXIF) format, Progressive JPEG file format (PJP), etc. Other image encoding standards or file formats may be used in other implementations. For computational efficiency it is advantageous to use an encoding scheme and file format for which the receiving device has a standardized decoder implementation. This enables the receiving device to utilize customized hardware and/or software for computationally efficient decoding and reconstruction of the blurred image.

The spectral transform used may be a discrete cosine transform (DCT) in some implementations. DCT is commonly used in many image coding standards; however, other spectral transforms may be used. It may be advantageous to use the same spectral transform to initially convert the image to the frequency domain for low-pass filtering that is then used in the standardized encoding applied to the blurred image once it is back in the pixel domain, since the initial use of the spectral transform may ensure the data of the blurred image is biased towards efficient compression using the standardized encoding that relies on the same spectral transform.

Figure 1A:
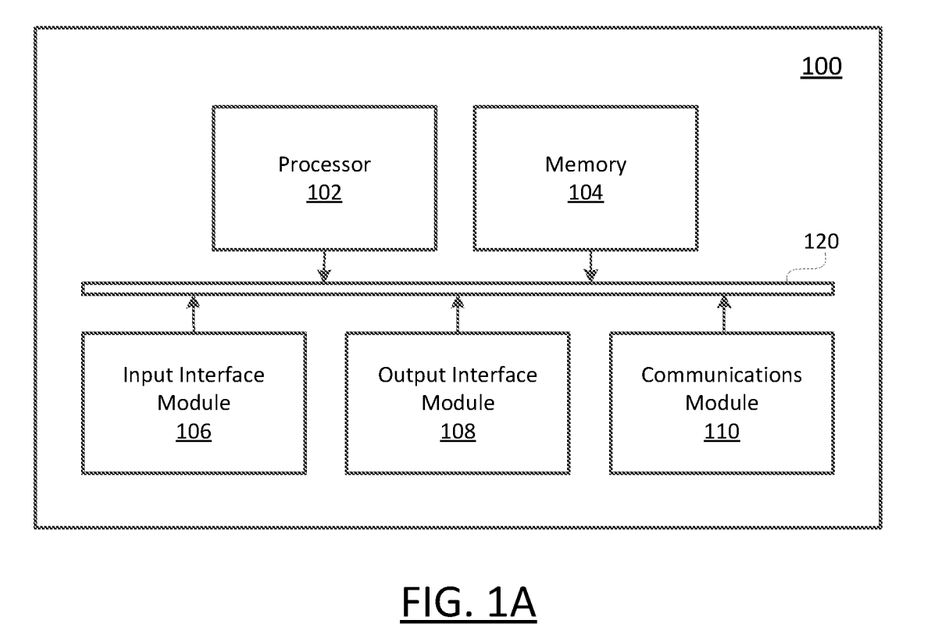
FIG. 1A is high-level schematic diagram of a computing device.

Reference is first made to FIG. 1A, which shows a high-level operation diagram of an example computing device 100. In at least some embodiments, the example computing device 100 may be exemplary of an application server, a web server, a client device or another such computing device. The example computing device 100 includes a variety of modules. For example, as illustrated, the example computing device 100, may include a processor 102, a memory 104, an input interface module 106, an output interface module 108, and a communications module 110. As illustrated, the foregoing example modules of the example computing device 100 are in communication over a bus 120.

The processor 102 is a hardware processor. Processor 102 may, for example, be one or more ARM, Intel x86, PowerPC processors or the like. Processor 102 may include a multi-core processor and/or more than one processor.

The memory 104 allows data to be stored and retrieved. The memory 104 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 100.

The input interface module 106 allows the example computing device 100 to receive input signals. Input signals may, for example, correspond to input received from a user. The input interface module 106 may serve to interconnect the example computing device 100 with one or more input devices. Input signals may be received from input devices by the input interface module 106. Input devices may, for example, include one or more of a touchscreen input, keyboard, trackball or the like. In some embodiments, all or a portion of the input interface module 106 may be integrated with an input device. For example, the input interface module 106 may be integrated with one of the aforementioned example input devices.

The output interface module 108 allows the example computing device 100 to provide output signals. Some output signals may, for example, allow provision of output to a user. The output interface module 108 may serve to interconnect the example computing device 100 with one or more output devices. Output signals may be sent to output devices by output interface module 108. Output devices may include, for example, a display screen such as, for example, a liquid crystal display (LCD), and/or a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface module 230 may be integrated with an output device. For example, the output interface module 108 may be integrated with one of the aforementioned example output devices.

The communications module 110 allows the example computing device 100 to communicate with other electronic devices and/or various communications networks. For example, the communications module 110 may allow the example computing device 100 to send or receive communications signals. Communications signals may be sent or received according to one or more protocols or according to one or more standards. For example, the communications module 110 may allow the example computing device 100 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 110 may allow the example computing device 100 to communicate using near-field communication (NFC), via Wi-Fi™, using Bluetooth™ or via some combination of one or more networks or protocols. Contactless payments may be made using NFC. In some embodiments, all or a portion of the communications module 110 may be integrated into a component of the example computing device 100. For example, the communications module 110 may be integrated into a communications chipset.

Software comprising instructions is executed by the processor 102 from a computer-readable medium. For example, software may be loaded into random-access memory from persistent storage of memory 104. Additionally, or alternatively, instructions may be executed by the processor 102 directly from read-only memory of memory 104.

Figure 1B:
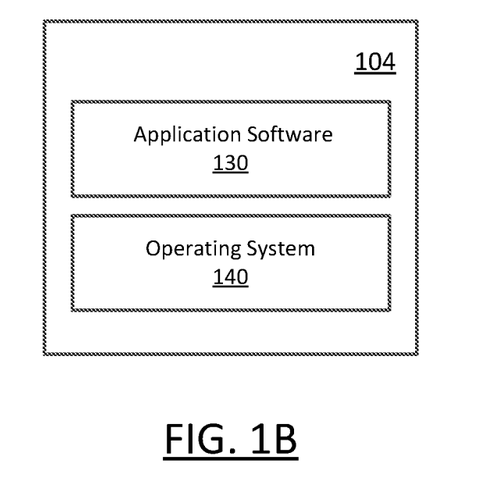
FIG. 1B shows a simplified organization of software components stored in a memory of the computing device of FIG. 1A.

FIG. 1B depicts a simplified organization of software components stored in memory 104 of the example computing device 100. As illustrated, these software components include application software 130 and an operating system 140.

The application software 130 adapts the example computing device 100, in combination with the operating system 140, to operate as a device performing a particular function. In some embodiments, the application software 130 may include software that, when executed by the processor 102, causes the processor 102 to carry out one or more of the operations or functions described herein.

In one example, where the computing device 100 operates as a webserver or application server, the application software 130 may configure the processor 102 to generate a compressed blurred image, as will be described further below, and may configure the processor 102 to encode and/or transmit that compressed blurred image to a receiving or client device. In some cases, the encoded compressed blurred image may be embedded in a webpage or other markup language document or other document stored in the memory 104, and transmitted to a client device in response to a request.

The operating system 140 is software. The operating system 140 allows the application software 130 to access the processor 102, the memory 104, the input interface module 106, the output interface module 108 and the communications module 110. The operating system 140 may be, for example, Apple iOS™, Google™ Android™, Linux™, Microsoft™ Windows™, or the like.

In some cases, where the computing device 100 is a client device configured to receive and display graphical content using a web browser and/or mobile application, the computing device 100 may include a native image decoding module. The native image decoding module may be implemented within the application software 130 or within the operating system 140. The native image decoding module may employ, in part, dedicated hardware designed for image decompression and reconstruction, such as a graphics processor or the like. In some cases, the native image decoding module may conform to a standardized image decoding scheme, such as JPEG.

Figure 2:
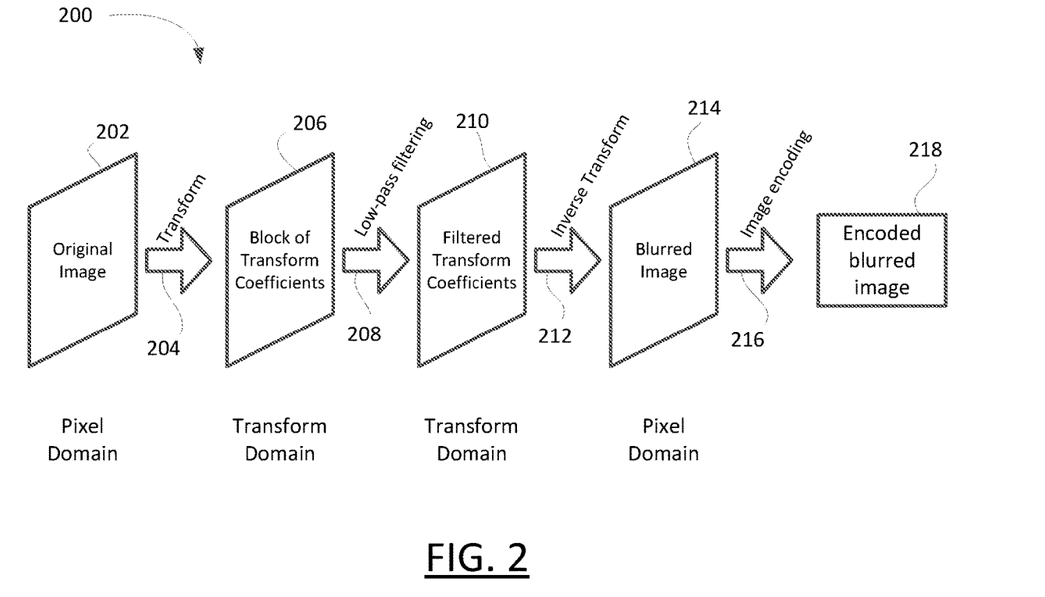
FIG. 2 illustrates one example encoding process for generating a blurred image.

Reference will now be made to FIG. 2, which graphically illustrates one example encoding process 200. The encoding process 200 may be implemented by the computing device 100 (FIG. 1A) and, in particular, by the application software 130 (FIG. 1B) or the operating system 140 (FIG. 1B). The computing device 100 may be a web server, application server, or other type of server configured to send files to a client device where the files include high resolution image files.

The process 200 begins with an original image 202. The original image 202 is an N×M image in the pixel domain. The original image 202 may be defined in any suitable image format colour space, including the RGB (red-green-blue) colour space or the YUV (luma-chroma) colour space. In the discussion herein and elsewhere in the present application, the encoding processes, such as the encoding process 200, may be described in terms of a single image or block of data. It will be appreciated that the encoding of the image may include separate application of the encoding process to different components of the image, such as the luma values and the chroma values. In some cases, chroma subsampling may be used.

A spectral transform 204 is applied to the original image 202 to convert it to a block of transform coefficients 206. In particular, the spectral transform 204 may be an N×M two-dimensional spectral transform. The spectral transform 204 may be a DCT transform in many implementations. The resulting block of transform coefficients 206 represents the original image 202 in the frequency domain. Due to the nature of spectral transforms, the data is concentrated in the upper left corner of the block of transform coefficients 206. The upper leftmost value is a DC value. Values towards the right or lower in the block of transform coefficients 206 are higher frequency components representative of sharper, more abrupt, changes in image characteristics (brightness/intensity or colour) in the original image 202.

The encoding process 200 then involves low-pass filtering 208 the block of transform coefficients 206 within the frequency domain to produce a block of filtered transform coefficients 210. The low-pass filtering 208 may include discarding or zeroing a plurality of high frequency components. For example, the low-pass filtering 208 may include retaining only a selected sub-block or sub-set of the transform coefficients in the upper left portion of the block of transform domain coefficients 206. In some cases, the low-pass filtering 208 may further be combined with quantization, such that the retained low-frequency coefficients are also quantized. As will be seen, the low-pass filtering 208 applied is aggressive enough to discard much of the high frequency detail, thereby obscuring or blurring the details of the image in the pixel domain to such a degree that they are no longer discernible. In some cases, the low-pass filtering 208 applied to a luma block may be different from the low pass filtering applied to a chroma block. For example, the luma block may be more aggressively filtered than the chroma block to more completely blur the intensity/brightness details of the image but retain the general colour scheme.

After low-pass filtering 208 is applied to obtain the block of filtered transform coefficients 210, an inverse spectral transform 212 is applied to convert the block of filtered transform coefficients 210 to the pixel domain as a blurred image 214. The inverse spectral transform 212 is the inverse of the spectral transform 204 applied earlier. In many implementations, the inverse spectral transform 212 is an inverse DCT (IDCT) operation. The inverse spectral transform 212 may be an N×M inverse spectral transform so as to produce an N×M size blurred image 214. If the low-pass filtering 208 applied is selected to be sufficiently selective, then the blurred image 214 should retain little to no discernable detail regarding the subject matter of the image, but should retain sufficient blurred colour data to give an overall sense of the dominant colour scheme of the image without revealing its content.

Encoding 216 may then be applied to the blurred image 214 using a standard image encoding scheme, such as JPEG, to produce an encoded blurred image 218. The encoding 216 may employ a dedicated image encoder configured to produce standards-compliant encoded image files. The output file format from the encoder may be prescribed by the applicable encoding standard. In one example, the output file format may be JFIF.

The encoding 216 of the blurred image 214 may result in a particularly compact encoded blurred image 218 due to the initial application of the spectral transform 204, which may align or bias the eventual blurred image data in a manner that makes it amenable to compact encoding using the same spectral transform during the encoding 216. The encoded blurred image 218 may further be particularly compact due to the low-pass filtering 208 that resulted in discarding the bulk of the high-frequency components of the image.

The encoded blurred image 218 may then be efficiently transmitted to a client device, on which it may be quickly decoded and displayed using a standardized image decoder. The reconstructed blurred image produced at the client device may then be displayed in place of a high resolution version of the original image 202, which is separately encoded by the server and which the client device separately downloads and decodes. Once the client device has managed to download and decode the high-resolution version of the original image 202, it may replace the displayed reconstructed blurred image with the reconstructed high-resolution image. Note that the reconstructed blurred image in this illustrative example is the same N×M size as the original image 202.

In some other embodiments, to improve the speed of encoding and decoding and to reduce the file size, the original image 202 may be downscaled prior to application of the encoding process 200. That is, the original image 202 may be of size n×m, where n>N and m>M. The original image 202 may be downscaled to produce a downscaled original image of size N×M before application of the spectral transform 204. The scaling factor for upscaling the reconstructed blurred image from size N×M to size n x in at the client device may be included in metadata accompanying the encoded blurred image 218 when it is sent to the client device. The downscaling may be selected to be by a factor of 2 in both the x and y dimensions, for ease of implementation. The downscaling may be selected, in some cases, to produce a resultant downscaled image of size N×M that matches a preferred or preset DCT configuration. For example, the downscaling may be selected to result in an 8×8 or 16×16 or 32×32 downscaled image.

The downscaling may be implemented using any one or more of a number of downscaling algorithms. Examples include using a low pass filter (e.g. such as with a Gaussian pyramid) and then decimating, pixel averaging, Lanczos resampling, sinc filtering, local (area) averaging of samples, Gaussian resampling, or others.

Figure 3:
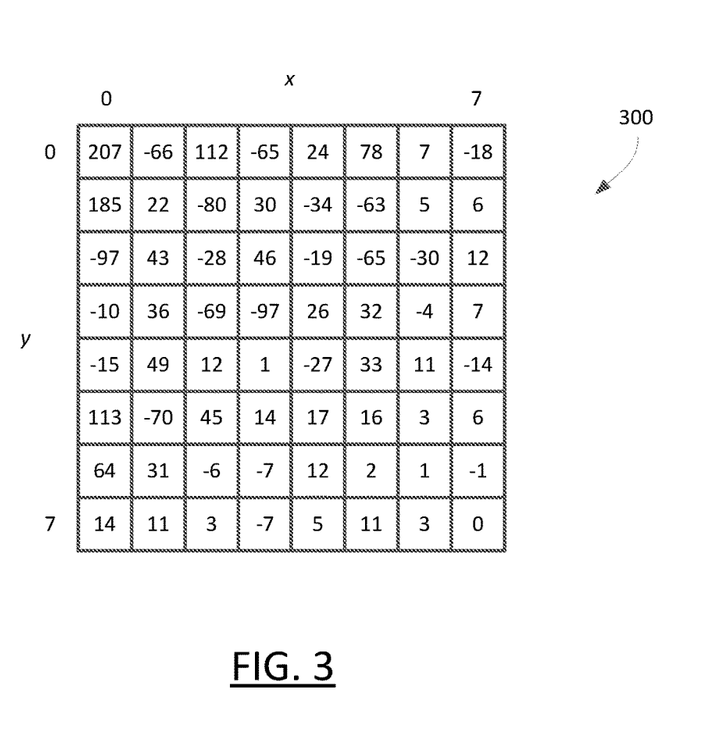
FIG. 3 shows an example of a block of transform domain coefficients.

FIG. 3 shows one illustrative example of a block of transform domain coefficients 300. In this example, the block is an 8×8 block resulting from application of an 8×8 2-dimensional DCT to an 8×8 downscaled original image. It may be noted that the block of transform domain coefficients 300 tends to concentrate its larger values towards the upper-left, i.e. the DC coefficient and surrounding low frequency coefficients. The coefficients towards the right or the bottom of the block are high frequency components and tend to be smaller.

Figure 4:
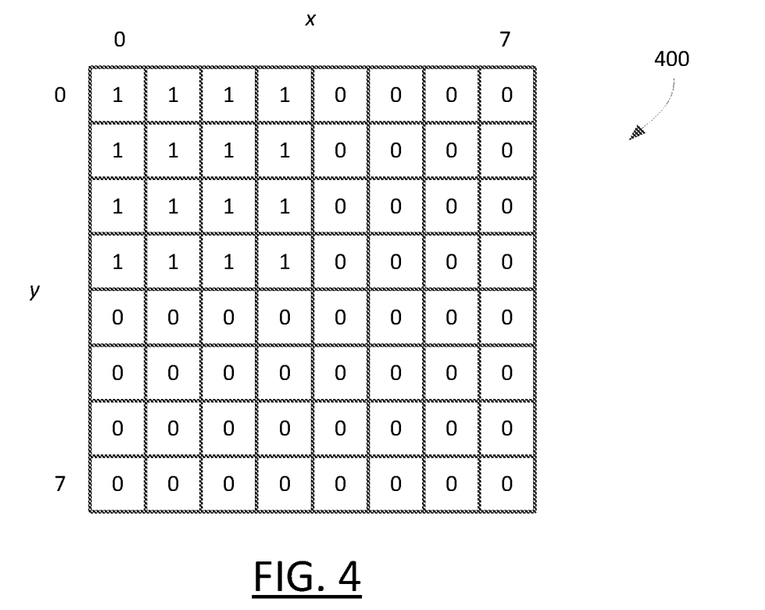
FIG. 4 shows a first example mask for low-pass filtering transform coefficients.

To low-pass filter the example block of transform domain coefficients 300, a mask may be applied to select a subset or sub-block of the coefficients. FIG. 4 illustrates one example of a mask 400. The mask may correspond in size to the block of coefficients, and may include binary values indicating the coefficients to be retained (1) and discarded (0) from the block as a result of the low-pass filtering. The mask 400 in this example selects the upper left 4×4 sub-block of transform coefficients.

Figure 5:
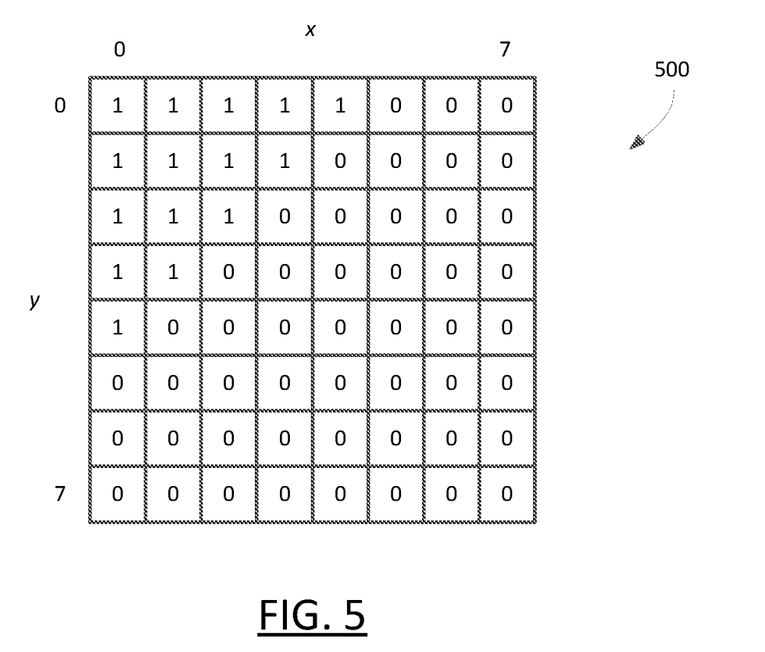
FIG. 5 shows another example mask for low-pass filtering transform coefficients.

Another example mask 500 is shown in FIG. 5, where the selected sub-set includes a set of the upper left coefficients. In this example, the selected coefficients are those in positions (x, y) for which x+y<5.

Figure 6:
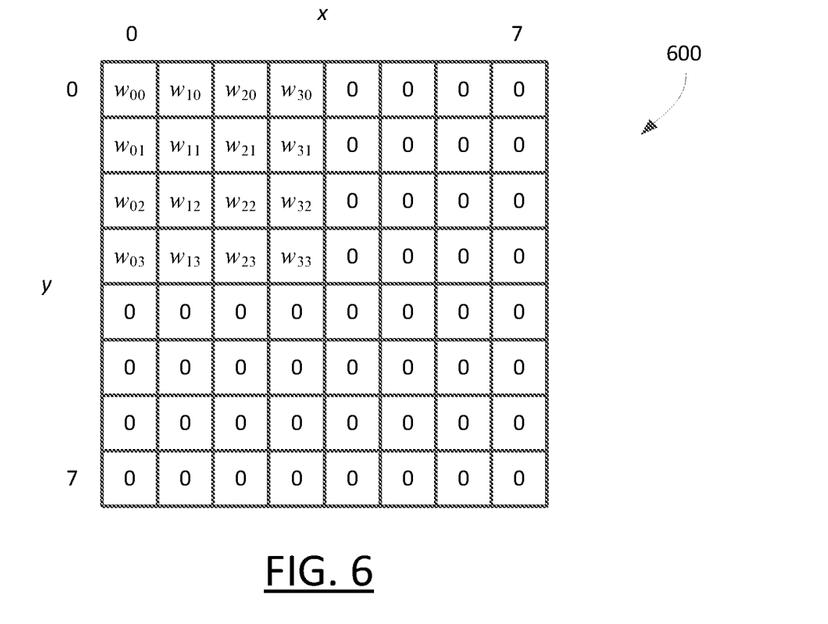
FIG. 6 shows a further example mask for low-pass filtering transform coefficients.

In some examples, the low-pass filtering may be combined with quantization or weighting. Quantization introduces distortion but improves compression by reducing the magnitude of the coefficients. In this case, the quantization may assist in blurring some details of the image prior to its encoding using the standardized encoding scheme. FIG. 6 shows an example mask 600 for selecting a subset of transform coefficients, where the selected coefficients are multiplied by a weighting factor $w_{ij}$. In some implementations, instead of a weighting factor the mask may specify a quantization value. In some cases, the weighting factor or quantization factor may be the same for all positions of the selected subset of transform coefficients, i.e. uniform weighting or quantization. In some other cases, the weighting factor or quantization factor may vary by position, for example to more aggressively quantize higher frequency components.

Figure 7:
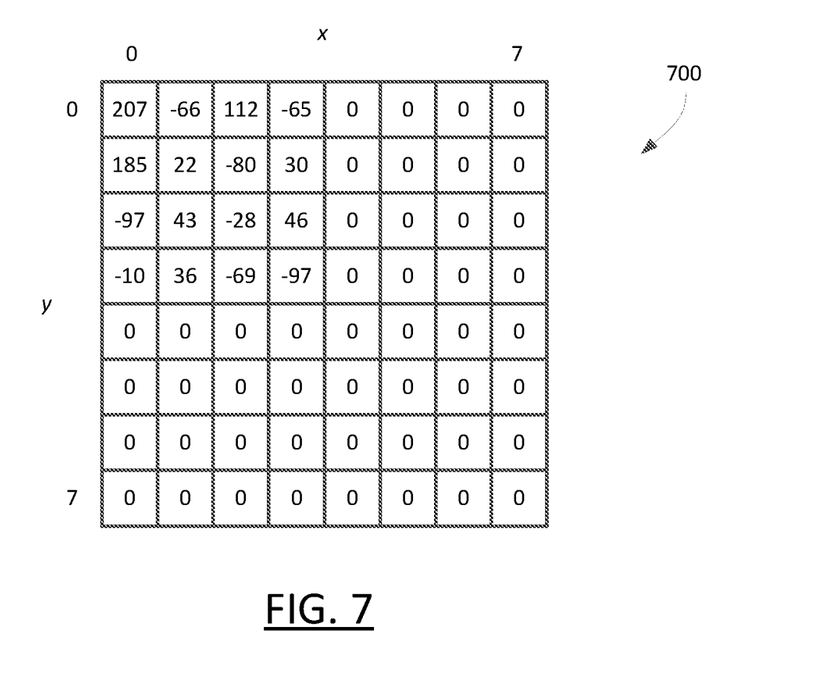
FIG. 7 shows an example filtered block of transform coefficients.

FIG. 7 illustrates the application of the example mask 400 of FIG. 4 to the example block of transform coefficients 300 of FIG. 3, to result in a filtered block of transform coefficients 700. The filtering in this example does not include any quantization.

While the foregoing examples used an 8×8 image and 8×8 transform as examples, it will be appreciated that the image may be of different sizes and aspect ratio. In many cases, the image may be much larger than 8×8, even when downscaled. The selected subset of coefficients may be a sub-block of size 4×4, 8×8, or another size or aspect ratio. The selected subset of coefficients may not be a sub-block and may be selected on the basis of positions x+y<N in some cases. Other masks or patterns of coefficients that may be selected to result in frequency domain low-pass filtering may be used.

In order to apply sufficient low-pass filtering to blur the image in the pixel domain, a sufficiently small portion of the DCT coefficients is to be selected, such that the filtering effectively discards much of the information contained in the image. The subset may be 4×4 coefficients or smaller in many cases, where the size of the image and size of the block of transform coefficient is much larger than 4×4.

Figure 8:
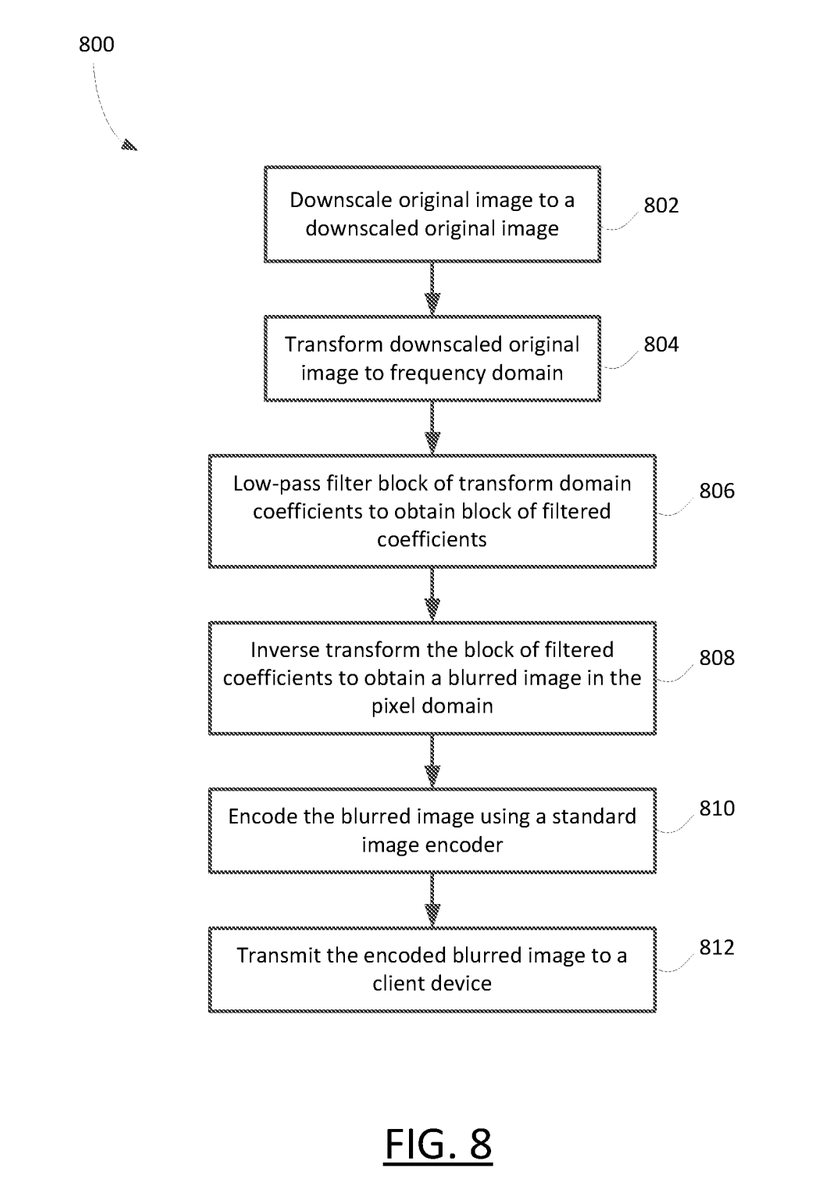
FIG. 8 shows, in flowchart form, one example method of generating a blurred image from an original image.

Reference will now be made to FIG. 8, which shows in flowchart form one example method 800 for generating a blurred image. The method 800 may be implemented by a software module or application executed by an application server or web server in some instances. The method 800 may be applied to generate a blurred version of an original image. The blurred version may be generated to be a compact decoding-efficient representation of the original image. In some cases, the blurred version may be a stand-alone small standards-compliant file format that a client device may decode using a standard image decoder in order to reconstruct and display the blurred image. In some cases, the standards-compliant image encoding may itself be encoded and embedded in a mark-up language document.

The method 800 may include an operation 802 of first downscaling the original image to a downscaled image. In some cases the scaling factor is selected so as to make subsequent processing by a spectral transform, such as DCT, computationally efficient. In some cases, the scaling factor may be selected to be a factor of $2^i$. Use of a $2^i$ scaling factor may make the downscaling and later upscaling more computationally efficient in some implementations. In some cases, the scaling factor is selected such that the dimensions of the resulting downscaled image area have a size of $2^i \times 2^j$, where i and j are integers greater than 1. The scaling factor may be selected to result in a downscaled image of dimensions that match a preset or preconfigured DCT algorithm size. Examples may include 8×8, 16×16, 32×32, 64×64, etc.

In operation 804, the downscaled image is transformed to the frequency domain using a 2-dimensional spectral transform. The 2-dimensional spectral transform may be a 2D-DCT operation. Any suitable other transform may be used in different embodiments. The result of the transform is a block of transform coefficients. It will be appreciated that the entire downscaled image is spectrally transformed to the frequency domain with partitioning it into sub-blocks to which the DCT is applied individually. Instead, the DCT operation is applied to the downscaled image as a whole.

In operation 806, the block of transform coefficients is low-pass filtered. The low-pass filtering applied may be sufficiently selected to remove most discernible detail from the pixel-domain version of the image whilst preserving a blurred sense of the colour spectrum of the image. In some implementations, the low-pass filtering may be selection of the upper left 4×4 sub-block of the block of transform coefficients and the zeroing of all other coefficients in the block. In some implementations, the selected sub-block is 8×8. In some implementations, a non-square subset is selected. The non-square subset may be based on selecting the coefficients in positions (x, y), where x+y<N. Other mechanisms for selecting the DC coefficient and nearby low-frequency coefficients may be used. The result is a filtered block of coefficients.

In operation 808, an inverse spectral transform is applied to the filtered block of coefficients to transform it back to the pixel domain as a blurred image. The inverse spectral transform is a 2-dimensional spectral transform the same size as the spectral transform applied in operation 804. Accordingly, in some examples, the resulting blurred image in the pixel domain has the same dimensions and aspect ratio as the downscaled image. In some cases, the inverse spectral transform operation may be applied so as to upscale the blurred image from the dimensions of the filtered block of coefficients. In some cases, the inverse spectral transform operation may apply further downscaling in converting the filtered block of coefficients to a blurred pixel domain image. In some implementations, the inverse spectral transform is applied with an embedded upscaling factor that results in a pixel domain blurred image having the same dimensions as the original image.

The blurred image is then encoded in operation 810 using a standard image encoding scheme, such as JPEG. The result may be a bitstream or bytestream of encoded image data. The output may be stored in a standardized image file format, such as JFIF, EXIF, PJP, etc.

In some cases, encoded image data may be further encoded. For example, the resultant bitstream or bytestream from the image encoder may be further encoded using, for instance, Base64 encoding to produce a character string. Other types of encoding may be used, including other types of converting binary to character strings, such as Base83, Base85, or others. The resulting character string may then be embedded in a mark-up language document or other file that is to be downloaded to a client device.

For example, a webpage may contain a reference to a high-resolution image, which the client device will need to download, decode, reconstruct, and display in the manner instructed by the webpage. The webpage may further provide a placeholder image in the form of the string. The client device may decode the string on the basis of the Base64 coding to recover the encoded blurred image bitstream or bytestream, which it may then pass to a dedicated standardized image decoder to obtain a reconstruction of the blurred image. The client device may then display the reconstructed blurred image in the place defined by the webpage whilst awaiting download and reconstruction of the higher-resolution image.

The webpage may contain suitable mark-up language tags or other indicators signaling that the embedded string is an encoded blurred placeholder image corresponding to the high-resolution image. In some cases, the webpage may further provide a scaling factor to enable the client device to upscale the reconstructed blurred image to the same size as the high-resolution image.

In some cases, the webpage may signal that the blurred image is to be displayed in place of the high-resolution image, and that the high-resolution image is not to be downloaded and decoded. The webpage may include certain conditionals, such as for example the country location of the client device, which cause the blurred image to be used instead of the high-resolution image.

References to image coding processes above may have been described with regard to an image containing "pixel values". Those skilled in the art will appreciate that many coding schemes separately encode luma and chroma data, or RGB data, and the present techniques may be applied to coding of multiple components of a colour image. Chroma subsampling may or may not be applied in the standardized encoding operation.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
    transforming an original image to a block of coefficients in a frequency domain using a spectral transform, wherein the spectral transform is selected to be a same spectral transform used in a particular lossy-compression image encoding;
    low-pass filtering the block of coefficients in the frequency domain to produce a block of filtered coefficients;
    inverse transforming the block of filtered coefficients to produce a blurred image in a pixel domain using an inverse transform to the spectral transform;
    encoding the blurred image using the particular lossy-compression image encoding to produce an encoded blurred image, wherein the particular lossy-compression image encoding includes transforming the blurred image using the same spectral transform; and
    transmitting the encoded blurred image to a client device for reconstruction and display by the client device.

2. The method of claim 1, wherein the spectral transform is a two-dimensional discrete-cosine transform (DCT).

3. The method of claim 2, wherein the original image is of size N×M pixels and the two-dimensional DCT is an N×M DCT operation.

4. The method of claim 2, wherein the particular lossy-compression image encoding is JPEG.

5. The method of claim 2, wherein the encoded blurred image is in JFIF, EXIF, or PJP format.

6. The method of claim 1, wherein the low-pass filtering includes applying a mask to the block of coefficients whereby coefficients outside a selected subset defined by the mask are set to zero.

7. The method of claim 6, wherein the selected subset includes a DC coefficient in an upper left corner of the block of coefficients and a plurality of coefficients adjacent to the DC coefficient.

8. The method of claim 7, wherein the selected subset includes a quarter or fewer of the coefficients in the block of coefficients.

9. The method of claim 7, wherein the selected subset includes a sub-block smaller than the block of coefficients and positioned in the upper left corner of the block of coefficients.

10. The method of claim 1, further comprising first down-scaling a full-size image in the pixel domain to obtain the original image.

11. The method of claim 1, wherein encoding includes outputting the encoded blurred image, and wherein transmitting includes encoding the encoded blurred image as a string and inserting the string in a markup language document transmitted to the client device.

12. The method of claim 11, wherein the markup language document includes a webpage.

13. The method of claim 12, wherein the webpage further includes x and y dimensions associated with the string, and a scaling factor for upscaling a reconstructed blurred image from the string based on the dimensions.

14. The method of claim 13, wherein the webpage further includes a reference to a high resolution image file corresponding to the original image, and instructions to replace display of the reconstructed blurred image with a reconstructed high resolution image obtained by decoding the high resolution image file once available, the x and y dimensions corresponding to dimensions of the high resolution image file.

15. A computing system, comprising:
    a processor; and
    a memory storing computer-executable instructions that, when executed by the processor, are to cause the processor to:
        transform an original image to a block of coefficients in a frequency domain using a spectral transform, wherein the spectral transform is selected to be a same spectral transform used in a particular lossy-compression image encoding;
        low-pass filter the block of coefficients in the frequency domain to produce a block of filtered coefficients;
        inverse transform the block of filtered coefficients to produce a blurred image in a pixel domain using an inverse transform to the spectral transform;
        encode the blurred image using the particular lossy-compression image encoding to produce an encoded blurred image, wherein the particular lossy-compression image encoding includes transforming the blurred image using the same spectral transform; and
        transmit the encoded blurred image to a client device for reconstruction and display by the client device.

16. The computing system of claim 15, wherein the spectral transform is a two-dimensional discrete-cosine transform (DCT), and wherein the original image is of size N×M pixels and the two-dimensional DCT is an N×M DCT operation.

17. The computing system of claim 15, wherein the instructions, when executed, are to cause the processor to low-pass filter by applying a mask to the block of coefficients whereby coefficients outside a selected subset defined by the mask are set to zero.

18. The computing system of claim 17, wherein the selected subset includes a DC coefficient in an upper left corner of the block of coefficients and a plurality of coefficients adjacent to the DC coefficient.

19. The computing system of claim 15, wherein the instructions, when executed, are to further cause the processor to first down-scale a full-size image in the pixel domain to obtain the original image.

20. The computing system of claim 15, wherein the instructions, when executed, are to cause the processor to encode by outputting the encoded blurred image, and to transmit by encoding the encoded blurred image as a string and inserting the string in a markup language document transmitted to the client device.

21. A non-transitory, computer-readable medium storing computer-executable instructions that, when executed by a processor, are to cause the processor to:
transform an original image to a block of coefficients in a frequency domain using a spectral transform, wherein the spectral transform is selected to be a same spectral transform used in a particular lossy-compression image encoding;
low-pass filter the block of coefficients in the frequency domain to produce a block of filtered coefficients;
inverse transform the block of filtered coefficients to produce a blurred image in a pixel domain using an inverse transform to the spectral transform;
encode the blurred image using the particular lossy-compression image encoding to produce an encoded blurred image, wherein the particular lossy-compression image encoding includes transforming the blurred image using the same spectral transform; and
transmit the encoded blurred image to a client device for reconstruction and display by the client device.

\* \* \* \* \*